No. 763,340. PATENTED JUNE 21, 1904.
J. S. BRANDON.
VEHICLE ATTACHMENT FOR TAKING UP AND DISTRIBUTING WIRE.
APPLICATION FILED DEC. 28, 1903.
NO MODEL. 3 SHEETS—SHEET 2.
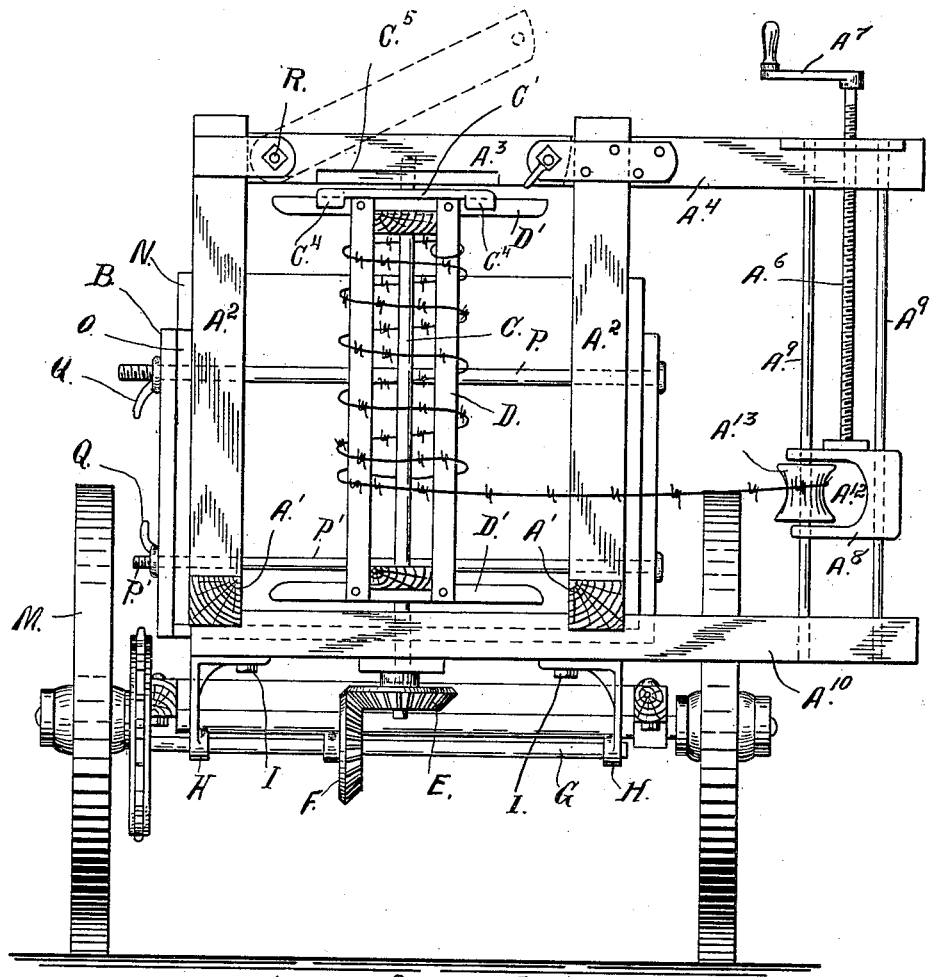
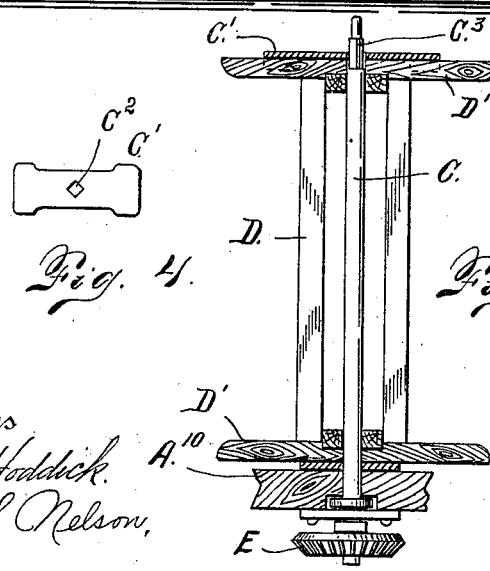

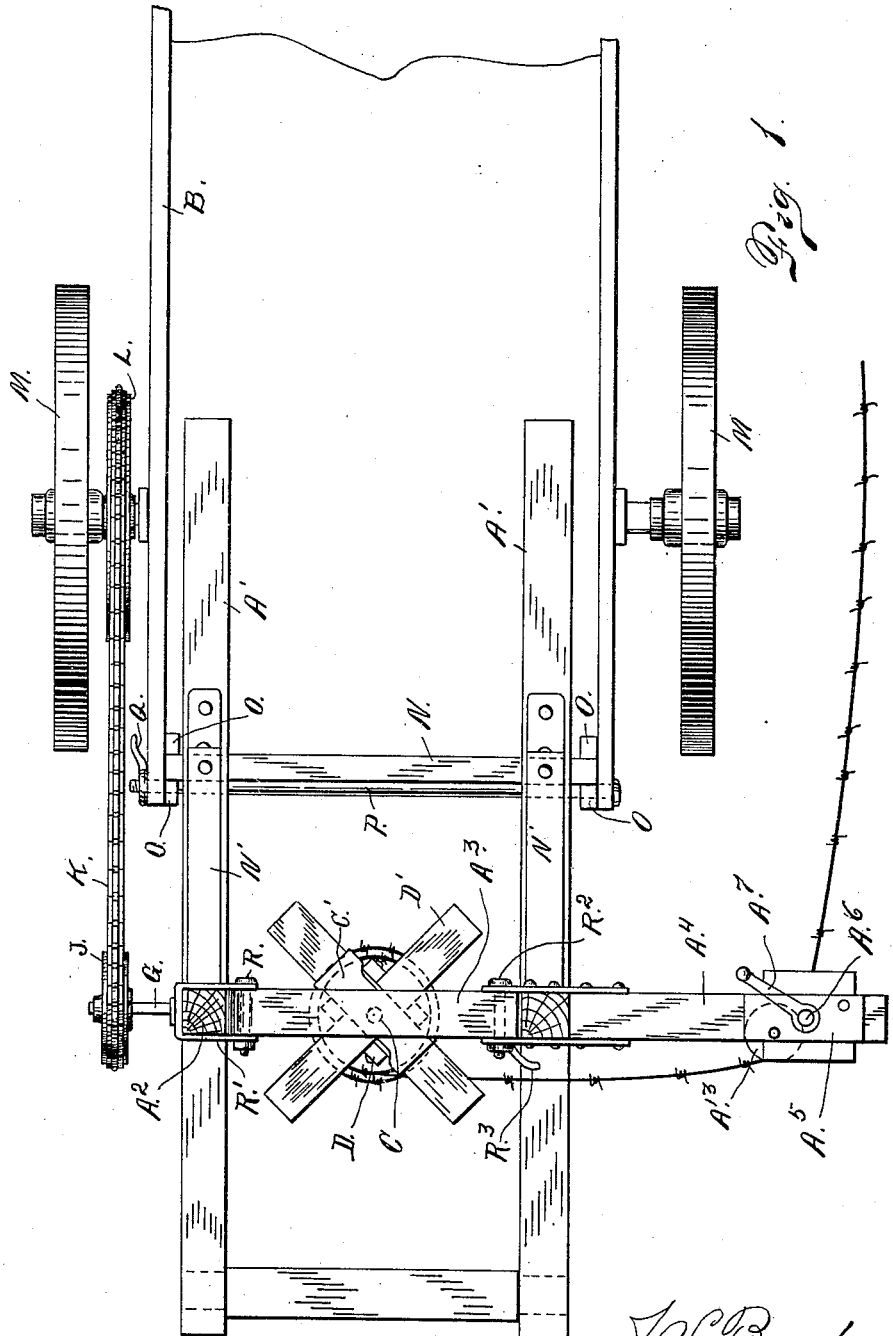

No. 763,340. PATENTED JUNE 21, 1904.
J. S. BRANDON.
VEHICLE ATTACHMENT FOR TAKING UP AND DISTRIBUTING WIRE.
APPLICATION FILED DEC. 28, 1903.
NO MODEL. 3 SHEETS—SHEET 3.
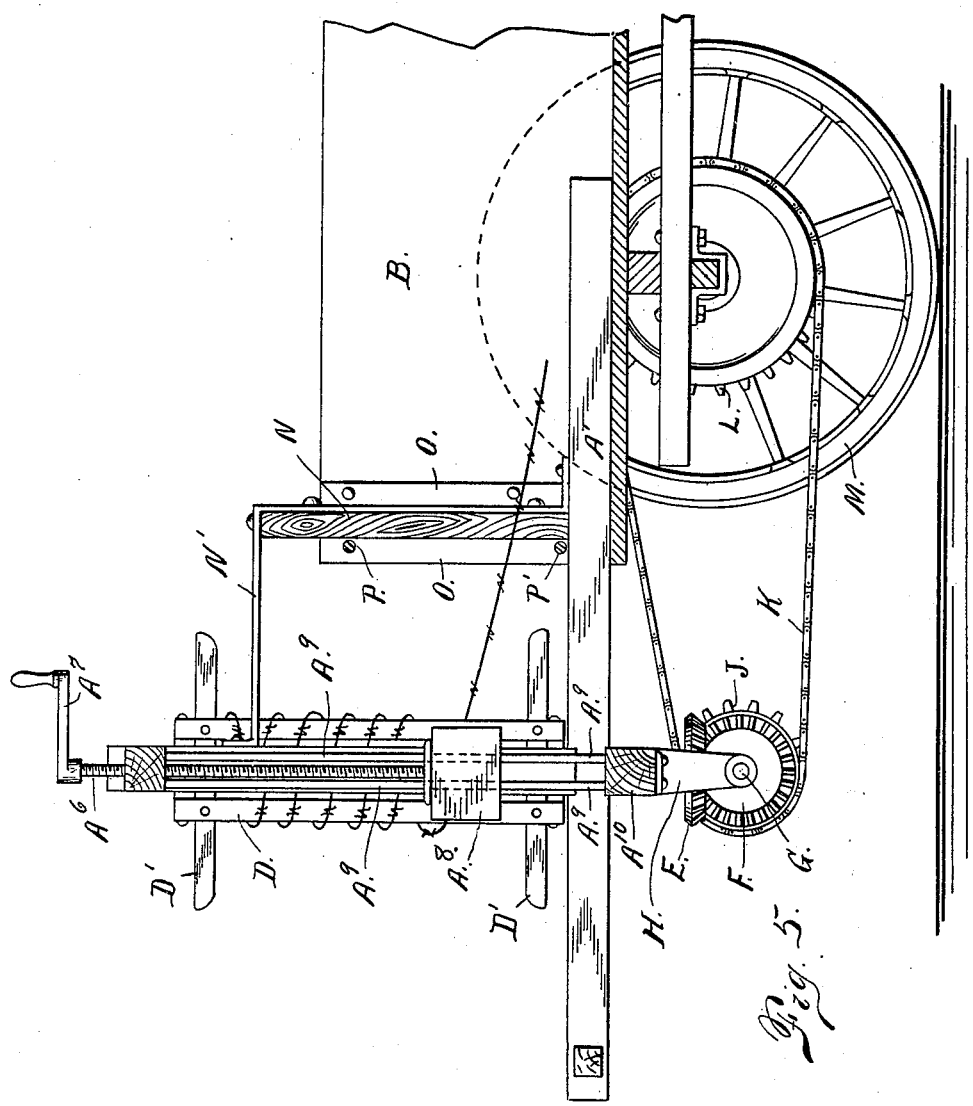

No. 763,340.

Patented June 21, 1904.

UNITED STATES PATENT OFFICE.

JAMES S. BRANDON, OF CHEYENNE, WYOMING.

VEHICLE ATTACHMENT FOR TAKING UP AND DISTRIBUTING WIRE.

SPECIFICATION forming part of Letters Patent No. 763,340, dated June 21, 1904.

Application filed December 28, 1903. Serial No. 186,901. (No model.)

*To all whom it may concern:*

Be it known that I, JAMES S. BRANDON, a citizen of the United States of America, residing at Cheyenne, in the county of Laramie and State of Wyoming, have invented certain new and useful Improvements in Vehicle Attachments for Taking Up and Distributing Fence-Wire; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a device adapted to be mounted on the rear end of a vehicle and operated from the running-gear thereof for taking up or distributing fence-wire.

It consists of a frame mounted at the rear end of a vehicle in which is journaled a spool adapted to be rotated from one of the wheels of the vehicle through the instrumentality of suitable shafts and gearing, whereby wire may be wound on the spool as the wagon is driven along or paid out from the spool, as may be desired. Of course in the paying-out operation the gearing connection with the wheel would not be necessary, since the pull of the wire would rotate the spool as the wagon proceeds.

Having briefly outlined my improved construction, as well as the function it is intended to perform, I will proceed to describe the same in detail, reference being made to the accompanying drawings, in which is illustrated an embodiment thereof.

In the drawings, Figure 1 is a top or plan view of the rear part of the vehicle equipped with my improvement. Fig. 2 is a rear view of the same. Fig. 3 is a sectional view of the spindle and its operating-shaft. Fig. 4 is a detail view of the top plate of the spindle. Fig. 5 is a side elevation of the apparatus, the wagon-body being shown partly in section.

The same reference characters indicate the same parts in all the views.

Let A designate two parallel separated frame-bars adapted to project into the rear end of the wagon-body B. Projecting upwardly from these bars are two posts $A^2$, which are suitably connected with a top cross-bar $A^3$, having an extension $A^4$, whose outer extremity on one side of the wagon is provided with a plate $A^5$, in which is threaded a vertically-disposed shaft $A^6$, provided at its upper extremity with a hand-crank $A^7$. The lower extremity of the screw-shaft $A^6$ is journaled in a block $A^8$, vertically slidable on two rods $A^9$, whose upper extremities are made fast to the bar extension $A^4$ and whose lower extremities are made fast to a bottom bar $A^{10}$ of the frame. This bottom cross-bar $A^{10}$ is suitably connected with the longitudinal bottom bars $A'$. The bar $A^{10}$ is located directly below and is parallel with the top bar parts $A^3$ and $A^4$. The block $A^8$ is hollowed out, as shown at $A^{12}$, to make room for a roller $A^{13}$, which is mounted to rotate on one of the guide-rods $A^9$. This spool is also adapted to slide vertically on the rod $A^9$ as the block is moved up and down. A vertical shaft C is journaled in the top and bottom bars $A^3$ and $A^{10}$ and a suitable spool composed of vertically-disposed parts D and end parts $D'$, which project beyond the extremities of the parts D in order to give the spool sufficient wire-holding capacity. The lower extremity of the shaft C passes downwardly through the bar $A^{10}$ and protrudes below the same far enough for the attachment of a bevel-gear E, which is made fast to the said shaft and meshes with another gear F, secured to a horizontal shaft G, journaled in hanger-brackets H, which are secured to the lower side of the bar $A^{10}$ by means of bolts I or other suitable fastening devices. The shaft G projects beyond one of the brackets H, as shown at the left of Fig. 2, and on this projecting extremity is made fast a sprocket-wheel J, connected by means of a chain K with a sprocket L, made fast to the hub of one of the vehicle-wheels, the said wheel being designated M in the drawings.

From the foregoing description it will be understood, assuming that the apparatus is made fast to the wagon-body, that as the wagon is driven along the spool will be rotated. If it is desired to take up a line of wire which is strung along the field—as, for instance, in taking down wire fence—one end of this wire is attached to the spool after passing through the opening A¹² of the block A⁸. This wire then engages the roller A¹³, and as the wagon is driven along the rotation of the spool winds up the wire thereon, the speed of the spool being regulated by means of suitable gears to properly harmonize with the travel of the vehicle.

As shown in the drawings, a transversely-located vertically-disposed board N is made fast to the framework of the device by means of metal straps N′. One extremity of each of these straps is made fast to a vertical bar A², while the other extremity passes downwardly on the inside of the board. (See Fig. 5 of the drawings.) This board N forms the rear end-gate of the wagon-body, and its extremities engage ways formed in the wagon-body by means of cleats O in the usual manner. The board is also secured in place by means of suitable rods P and P′, which are passed through the sides of the wagon-body above and below, while they are secured in place and made to clamp the board N by means of suitable nuts Q, which are provided with short projections or handles to facilitate their manipulation.

When it is desired to remove the spool from its framework, the bar part A³, which is hinged, as shown at R, to a pair of ears R′, is raised to the vertical position, thus releasing the upper extremity of the shaft C, allowing the spool to be lifted out from above. The bar part A³ is held in place when the apparatus is in use by means of a bolt R², secured by a nut R³.

From the foregoing description the use and operation of my improved apparatus will be readily understood. One end of the wire to be taken up being fastened to one of the vertical parts D of the spool, after passing the strand of wire through the block-opening A¹² and to engagement with the roller 13 the wagon is driven along. It is evident that the spool will now be rotated, and if the wire is connected originally to the top of the spool the convolutions should move from the top toward the bottom. In the meantime the person in charge of the business and mounted on the wagon operates the screw A⁶ fast enough to lower the block A⁸ to cause it to properly harmonize with the winding of the convolutions of wire on the spool from top to bottom. After the spool has a layer of wire formed by a series of convolutions and the wire strand is at the bottom of the spool the block A⁸ is gradually raised, whereby another layer or series of convolutions are wound upon the spool from bottom to top, and so on until the spool is full of wire or until the entire length or strand of wire has been taken up from the ground and placed upon the spool. As heretofore intimated, if it is desired to pay out this wire from the spool the sprocket-chain K will be removed from the sprocket-wheels J and L and the end of the wire secured to some object of suitable resistance. Then as the wagon is driven along the wire will be paid out or unwound from the spool and distributed along the ground where it is to be used.

In further explanation of the construction attention is called to the fact that a clutch-plate C′ is applied to the upper extremity of the spool. In the center of this plate is formed a square opening C², into which is fitted the squared portion C³ of the shaft C. The plate C′ is provided at each extremity with a pair of depending ears C⁴, which engage opposite sides of one of the cross-pieces D′ of the spool and lock the latter on the shaft. But for this plate the spool is loose on the shaft C. This plate is normally held in place by gravity and causes the spool to turn with the shafts C. When it is not desired that the spool shall be rotated from the running-gear of the wagon or vehicle, the clutch-plate C′ may be removed by raising the hinged part A³ of the frame and slipping the plate over the upper extremity of the shaft C. The removal of this plate obviates the necessity of detaching the chain K from the sprocket-wheels J and L. The plate C′ may also be temporarily lifted from the squared portion C³ of the shaft when for any reason it may be necessary to prevent the positive rotation of the spool during the movement of the vehicle. For this purpose a recess C⁵ is formed in the bar A³ immediately above the plate C′. This expedient may be resorted to in case as the diameter of the spool or reel increases with each layer of convolutions of wire it should be found necessary in order to obviate the necessity of throwing the device out of gear.

Having thus described my invention, what I claim is—

1. The combination with a vehicle, of a frame mounted thereon, a reel journaled in the frame, an operative connection between the reel and the running-gear of the vehicle, guide-rods mounted on the frame, a block mounted on said guide-rods, a roller journaled on one of the rods, the block being cut away to allow the roller to pass between the two arms of the block, and a screw-shaft journaled in the block and threaded in a part of the frame, whereby the block may be shifted in order to properly regulate the convolutions of the wire as they are wound on the reel.

2. The combination with a vehicle, of a frame mounted thereon, a reel mounted on the frame to rotate on a vertical axis, a gearing connection between the reel and the running-gear of the vehicle, a yoke-shaped block vertically movable, vertical guide-rods upon which the block is mounted, a roller journaled on one of the rods and located between the arms of the yoke-shaped frame, and a vertically-disposed feed-screw journaled in the block and threaded in the frame, one extremity of the screw being provided with a hand-crank to facilitate its rotation.

3. The combination with a vehicle, of a frame adapted to be mounted on the body of the vehicle, a vertically-disposed shaft having both extremities journaled in the frame, the upper portion of the frame being provided with a hinged piece which the upper extremity of the shaft engages, a spool loose on the shaft, an operative connection between said shaft and the running-gear of the vehicle, a clutch-plate having a polygonal opening normally fitted on a correspondingly-shaped portion of the shaft, the said plate being vertically movable upon the upper part of the shaft, the upper hinged part of the frame being cut away to permit the raising of the clutch-plate sufficiently to disengage it from the polygonal portion of the shaft whereby the latter is allowed to rotate independently of the spool.

4. The combination with a vehicle, of a frame adapted to be mounted on the body of the vehicle, a shaft journaled in the frame, a spool loose on the said shaft, an operative connection between said shaft and the running-gear of the vehicle, a clutch-plate having a polygonal opening normally fitted on a correspondingly-shaped portion of the shaft, the said plate engaging the spool to cause the latter to rotate with the shaft and being vertically movable on the upper part of the shaft, a portion of the frame being located above the spool and having a recess formed therein to receive the vertically-movable clutch-plate when the latter is raised to permit the shaft to rotate independently of the spool.

5. The combination with a vehicle, of a frame mounted thereon, a vertically-disposed reel journaled in the frame, and a vertically-movable guide-block mounted on the frame and through which the strand of wire is passed, for the purpose of controlling the winding of the convolutions on the reel, the upper portion of the frame in which the reel is journaled, being hinged at one end to permit the removal of the reel, substantially as described.

In testimony whereof I affix my signature in presence of two witnesses.

JAMES S. BRANDON.

Witnesses:
 BELLE CHAPMAN,
 MARK CHAPMAN.